E. W. McGuire.
Water Wheel.
N° 85,683. Patented Jan. 5, 1869.
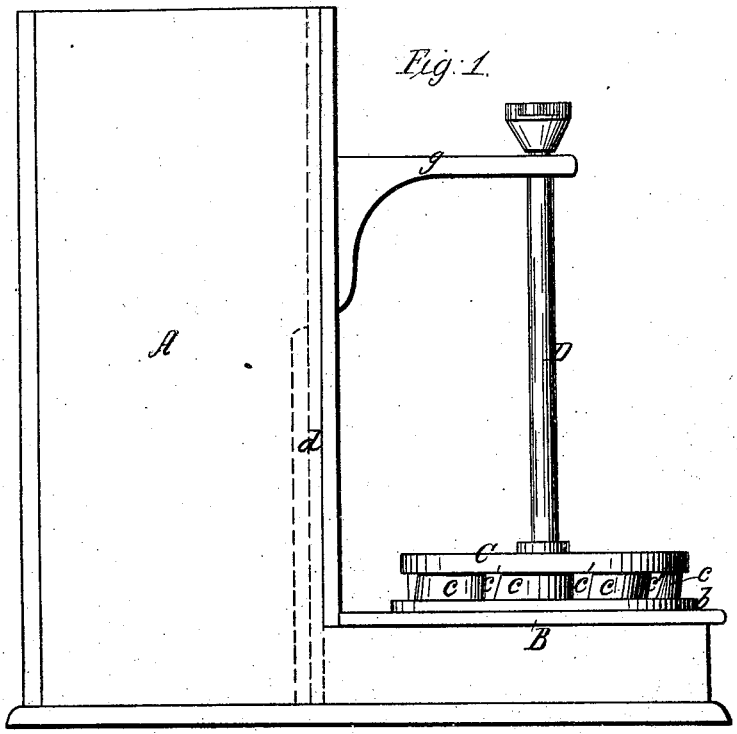
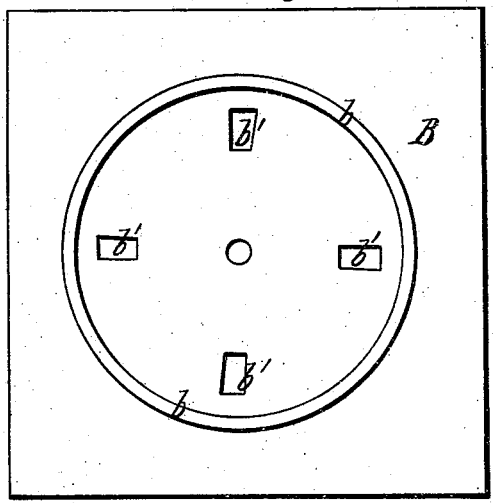
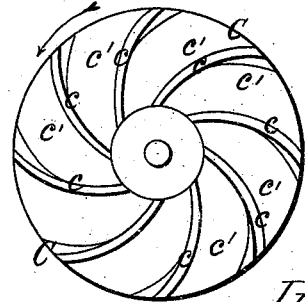
Witnesses
B. W. Moster
John A. Ellis
Inventor;
E. W. McGuire
Per
J. W. Alexander
Atty

United States Patent Office.

EZEKIEL W. McGUIRE, OF EATON, OHIO.

Letters Patent No. 85,683, dated January 5, 1869.

IMPROVEMENT IN WATER-WHEELS.

The Schedule referred to in these Letters Patent and making part of the same.

*To all whom it may concern:*

Be it known that I, EZEKIEL W. McGUIRE, of Eaton, in the county of Preble, and State of Ohio, have invented certain new and useful Improvements in Hydrostatic Water-Wheels; and I do hereby declare that the following is a full, clear, and exact description thereof, reference being had to the accompanying drawings, and to the letters of reference marked thereon, which form a part of this specification, and in which—

Figure 1 represents a side elevation of my wheel when in position for use;

Figure 2 is a plan view of the base or plate on which the wheel revolves;

Figure 3, an inverted view of my water-wheel; and

Figure 4, a cross-section, taken through one of the openings in the plate or base upon which the wheel stands, showing its shape or inclination.

The nature of my invention consists in the employment of certain devices, the peculiarities of which will be hereinafter set forth.

To enable others skilled in the art to which my invention appertains, to make and employ the same, I will now describe its construction and operation.

In the accompanying drawings—

A represents a reservoir or tank for water, which is made, at its lower end, to extend outwards a short distance from the main part of the tank.

Upon the projecting portion of the tank or reservoir A is secured the plate or base, B, which is provided at its centre with a circular flange or rim, $b$.

$b'$ $b'$ designate openings running diagonally through that portion of the plate B encircled by the rim or flange $b$, and are designed to allow the water from the chamber of the projecting part of reservoir A to come in contact with the wheel C, the water from the main part of the tank or reservoir being introduced into the above-named chamber by means of a sliding gate, $d$, shown in dotted lines in fig. 1.

C designates the wheel, which is scooped out or concaved on its upper side, with a hollow shoulder or receptacle for its shaft left thereon, in the centre of its concavity.

The lower side of wheel C is constructed with a convex surface, on which, and running flush with its lower central portion, as seen in fig. 3, are formed segmentary partitions, $c$ $c$, which are slightly curved outward at their upper ends, as shown in fig. 1, and between said partitions are formed the buckets, $c'$ $c'$, made as seen in fig. 3.

D is a vertical shaft, confined at its upper end by means of a horizontal support or bar, $g$, secured to the side of the reservoir A, and fastened at its lower end in the centre of wheel C.

Having thus described my invention,

What I claim, and desire to secure by Letters Patent, is—

The reservoir A, sliding gate $d$, bar or support $g$, shaft D, wheel C, plate B, and oblique openings $b$ $b$, all combined, constructed, arranged, and operating substantially as and for the purpose set forth.

In testimony that I claim the foregoing as my own, I affix my signature, in presence of two witnesses.

EZEKIEL W. McGUIRE.

Witnesses:
L. C. ABBOTT,
S. S. DIX.